United States Patent
Zhang et al.

(10) Patent No.: US 6,671,391 B1
(45) Date of Patent: Dec. 30, 2003

(54) POSE-ADAPTIVE FACE DETECTION SYSTEM AND PROCESS

(75) Inventors: Hong-Jiang Zhang, Beijing (CN); Ma Yong, Beijing (CN)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 09/580,395

(22) Filed: May 26, 2000

(51) Int. Cl.[7] .................................................. G06K 9/00
(52) U.S. Cl. ...................................... 382/118; 382/159
(58) Field of Search ................................ 382/118, 159, 382/155, 156, 181, 170, 225, 216

(56) References Cited

U.S. PATENT DOCUMENTS

| | | | | |
|---|---|---|---|---|
| 5,850,470 A | * | 12/1998 | Kung et al. ................. | 382/157 |
| 6,112,195 A | * | 8/2000 | Burges ........................ | 706/20 |
| 6,128,397 A | * | 10/2000 | Baluja et al. ............... | 382/118 |
| 6,134,344 A | * | 10/2000 | Burges ........................ | 382/155 |
| 6,144,755 A | * | 11/2000 | Niyogi et al. ............... | 382/118 |
| 6,157,921 A | * | 12/2000 | Barnhill ....................... | 706/16 |
| 6,421,463 B1 | * | 7/2002 | Poggio et al. .............. | 382/224 |

OTHER PUBLICATIONS

David Beymer and Tomaso Poggio, "Face Recognition from One Example View", Massachusetts Institute of Technology, Proc. Fifth Int'l Conf. Computer Vision, 1995.

T. Cootes, G. Edwards and C. Taylor, "Active Appearance Models", ECCV, 1998.

D. Beymer, "Face Recognition Under Varying Pose", AI Memo 1461.

K. Sung and T. Poggio, "Example-based Learning for View-Based Human Face Detection", AI Memo 1521, 1991.

M. Oren, C. Papageorgiou, P. Sinha, E. Osuma and T. Poggio, "Pedestrian Detection Using Wavelet Templates", CVPR 1997.

* cited by examiner

*Primary Examiner*—Samir Ahmed
*Assistant Examiner*—Virginia Kibler
(74) *Attorney, Agent, or Firm*—Lyon & Harr, LLP; Katrina A. Lyon

(57) ABSTRACT

A face detection system and process capable of detecting a person depicted in an input image and identifying their face pose. Prepared training images are used to train a 2-stage classifier which includes a bank of Support Vector Machines (SVMs) as an initial pre-classifier layer, and a neural network forming a subsequent decision classifier layer. Once the SVMs and the neural network are trained, input image regions are prepared and input into the system. An output is produced from the neural network which indicates first whether the region under consideration depicts a face, and secondly, if a face is present, into what pose range the pose of the face falls.

40 Claims, 9 Drawing Sheets

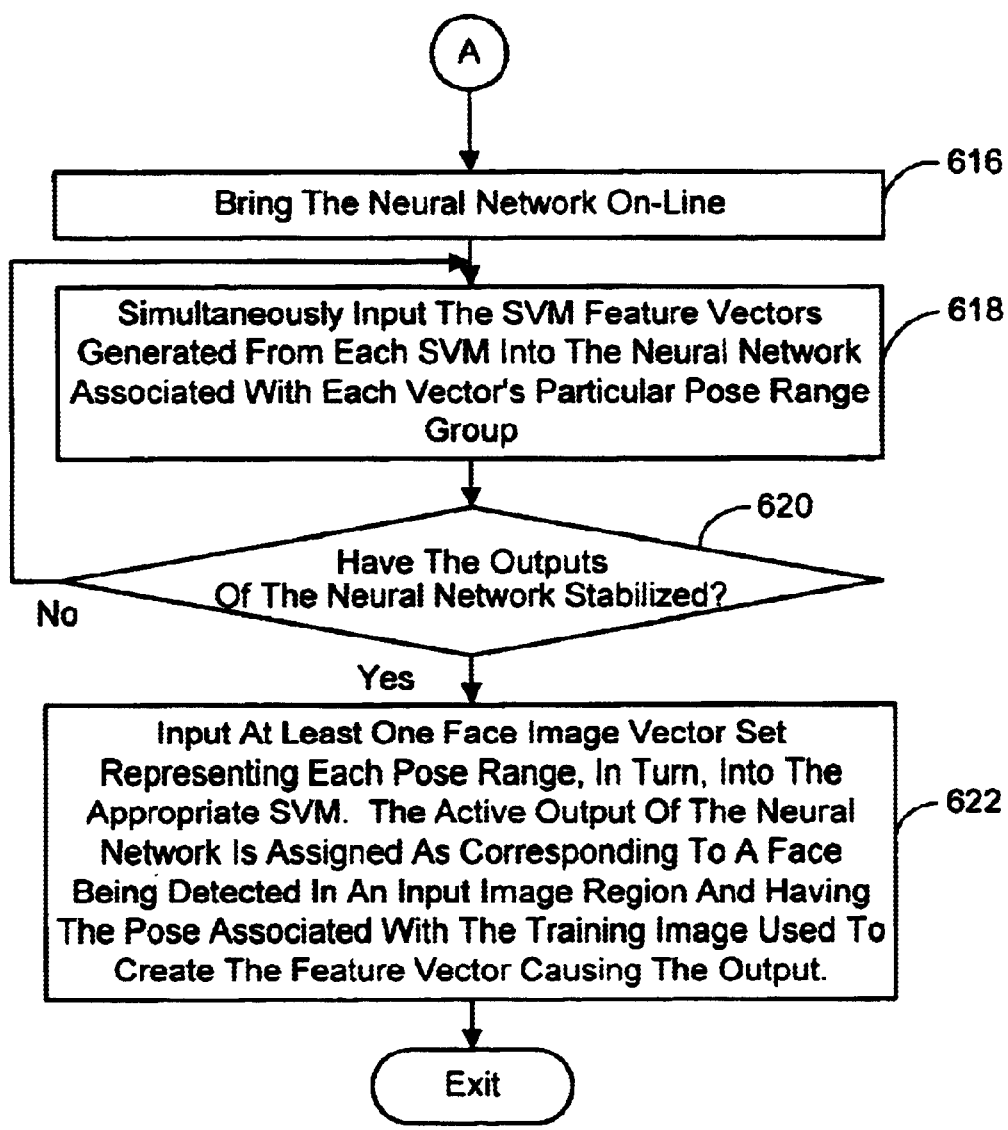

POSE-ADAPTIVE FACE DETECTION SYSTEM AND PROCESS

BACKGROUND

1. Technical Field

This invention is directed toward a face detection system and process for detecting the presence of faces of people depicted in an input image, and more particularly to such a face detection system and process that also identifies the face pose of each detected face.

2. Background Art

Face detection systems essentially operate by scanning an image for regions having attributes which would indicate that a region contains a person's face. To date, current systems are very limited in that detection is only possible in regions associated with a frontal view of a person's face. In addition, current detection systems have difficulty in detecting face regions in images having different lighting conditions or faces at different scales than the system was initially designed to handle.

The problem of detecting the faces of people depicted in an image from the appearance of their face has been studied for many years. Face recognition systems and processes essentially operate by comparing some type of training images depicting people's faces (or representations thereof) to an image or representation of a person's face extracted from an input image. In the past, most of these systems required that both the original training images and the input image region be essentially frontal views of the person. This is limiting in that to obtain the input images containing a frontal view of the face of the person being identified, that person had to either be purposefully positioned in front of a camera, or a frontal view had to be found and extracted from a non-staged input image (assuming such a frontal view exists in the image).

More recently there have been attempts to build a face detection and recognition system that works with faces rotated out of plane. For example, one approach for recognizing faces under varying poses is the Active Appearance Model proposed by Cootes et al. [1], which deforms a generic 3-D face model to fit the input image and uses control parameters as a feature fed to a classifier. Another approach is based on transforming an input image into stored prototypical faces and then using direct template matching to recognize the person whose face is depicted in the input image. This method is explored in the papers by Beymer [2], Poggio [3] and Vetter [4].

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention is directed toward a face detection system and process that overcomes the aforementioned limitations in prior face detection and recognition systems by making it possible to detect a person's face in input images containing either frontal or non-frontal views of the person's face, regardless of the scale or illumination conditions associated with the face. Thus, a non-staged image, such as a frame from a video camera monitoring a scene, can be searched to detect a region depicting the face of a person, without regard to whether the person is directly facing at the camera. Essentially, as long as the person's face is visible in the image being searched, the present face detection system can be used to detect the location of the face in the image. To date there have not been any face detection systems that could detect a person's face in non-frontal views. In addition, the present invention can be used to not only detect a person's face, but also provide pose information. This pose information can be quite useful. For example, knowing which way a person is facing can be useful in user interface and interactive applications where a system would respond differently depending on where a person is looking. Having pose information can also be useful in making more accurate 3D reconstructions from images of the scene. For instance, knowing that a person is facing another person can indicate the first person is talking to the second person. This is useful in such applications as virtual meeting reconstructions.

Because the present face detection system and associated process can be used to detect both frontal and non-frontal views of a person's face, it is termed a pose-adaptive face detection system. For convenience in describing the system and process, the term "pose" will refer to the particular pitch, roll and yaw angles that describe the position of a person's head (where the 0 degree pitch, roll and yaw position corresponds to a person facing the camera with their face centered about the camera's optical axis).

The pose-adaptive face detection system and process must first be trained before it can detect face regions in an input image. This training phase generally involves first capturing images of the faces of a plurality of people. As will be explained later, the captured face images will be used to train a series of Support Vector Machines (SVMs). Each SVM will be dedicated to a particular face pose, or more precisely a pose range. Accordingly, the captured face images should depict people having a variety of face poses. Only those face images depicting a person with a face pose that falls within the particular pose range of a SVM will be used to train that SVM. It is noted that the more diverse the training face images are, the more accurate the detecting capability of the SVM will become. Thus, it is preferred that the face images depict people which are not generally too similar in appearance. The training images can be captured in a variety of ways. One preferred method would involve positioning a subject in front of a video camera and capturing images (i.e., video frames) as the subject moves his or her head in a prescribed manner.

The captured face images are preprocessed to prepare them for input into the appropriate SVM. In general, this will involve normalizing, cropping, categorizing and finally abstracting the face images. Normalizing the training images preferably entails normalizing the scale of the images by resizing the images. It is noted that this action could be skipped if the images are captured at the desired scale thus eliminating the need for resizing. The desired scale for the face images is approximately the size of the smallest face region expected to be found in the input images that are to be searched. In a tested embodiment of the present invention, an image size of about 20 by 20 pixels was used with success. The image could additionally be normalized in regards to the eye locations within the image. In other words, each image would be adjusted so that the eye locations fell within a prescribed area. These normalization actions are performed so that each of the training images generally match as to orientation and size. The images are also preferably cropped to eliminate unneeded portions which could contribute to noise in the upcoming abstraction process. It is noted that the training images could be cropped first and then normalized, if desired. It is also noted that a histogram equalization, or similar procedure, could be employed to reduce the effects of illumination differences in the images that could introduce noise into the detecting process.

The next action in the training image preprocessing procedure involves categorizing the normalized and cropped images according to their pose. One preferred way of accomplishing this action is to group the images into a set of prescribed pose ranges. It is noted that the persons in the training images could be depicted with any combination of pitch, roll and yaw angles, as long as at least a portion of their face is visible. In such a case, the normalized and cropped images would be categorized into pose ranges defined by all three directional angles. The size of these pose ranges will depend on the application and the accuracy desired, but can be readily determined and optimized via conventional means.

The abstracting procedure is essentially a method of representing the images in a simpler form to reduce the processing load associated with the SVM's detection operation. While many abstraction processes might be employed for this purpose (e.g., histograming, Hausdorff distance, geometric hashing, active blobs, eigenface representations, and others), the preferred method entails the use of wavelet transforms, and particularly the use of three types of non-standard Haar wavelet transforms to represent each normalized, cropped, and categorized training face image, in a manner similar to that discussed in Oren [5]. Oren [5] discusses an image representation which captures the relationship between average intensities of neighboring image regions through the use of a family of basis functions, specifically Haar wavelets, which encode such relationships along different orientations. To this end, three types of 2-dimensional Haar wavelets are employed. These types include basis functions which capture change in intensity along the horizontal direction, the vertical direction and the diagonals (or corners). This Haar wavelet transform process is repeated to produce wavelet coefficients at two different scales, e.g., at 4×4 pixels and 2×2 pixels.

The result of the wavelet transform process is a series of coefficients. For each face pose range, a particular sub-set of these coefficients are selected to form a set of so-called feature vectors, although the same number of coefficients is used to make up each feature vector. It is noted that a different combination of coefficients may be needed to make up a feature vector associated with each pose range group. Thus, each training image is actually represented by a unique set of the computed feature vectors—one for each of the SVMs, tailored for each face pose range. Furthermore, all these feature vectors will be used to train the ensemble neural network.

This tailoring process begins by calculating the mean coefficients of all the training images. To this end, all the training images depicting a person exhibiting a face pose within a particular pose range are selected. The mean of all the horizontal wavelet coefficients associated with a particular pixel location of the selected training images that were computed under the first scale (e.g., 4×4), and the mean of all the horizontal wavelet coefficients associated with the pixel location that were computed under the other scale (e.g., 2×2), are calculated. The normalizing and cropping steps described previously will create training images that have the same size, and so the same number of corresponding pixel locations. This process is then repeated for each pixel location of the images. The process of computing the means of the wavelet coefficients associated with both scales for each pixel location is then repeated for the vertical wavelet coefficients and the diagonal wavelet coefficients. Thus, once all the coefficient means have been computed, there will be two average horizontal coefficients (i.e., one for each scale), as well as two average vertical and two average diagonal coefficients, associated with each pixel location of the training images. Those mean coefficients that have values outside a prescribed coefficient range are then identified. The pixel location and pedigree (i.e., direction and scale) of the identified mean coefficients are designated as the coefficients that will be used to form a feature vector for the particular pose range associated with the selected training images. The foregoing selection process is then repeated for the training images depicting faces exhibiting each of the remaining pose ranges. In this way a specific group of wavelet coefficients, as would be derived from any image undergoing the previously-described abstraction process, are identified for inclusion in a feature vector representing each of the pose ranges.

The prepared face image representations are used to train a 2-stage classifier which includes a bank of SVMs as an initial pre-classifier layer, and a neural network forming a subsequent decision classifier layer. As indicated previously, the bank of SVMs is composed of a plurality of SVMs each of which is trained to detect faces exhibiting a particular range of poses. To this end, the output of each SVM would indicate whether an input image region is a face having a pose within the SVM's range, or it is not. While this output could be binary (i.e., yes or no), it is preferred that a real-value output be produced. Essentially, the real-value output of each SVM pre-classifier is indicative of the distance of an input feature vector associated an input image region from a decision hyperplane defined by the face images used to train the SVM. In other words, the output indicates how closely an input feature vector fits into the face class represented by the SVM. Ideally, each SVM would be configured such that an image region that is not a face exhibiting a pose range associated with the SVM, or not depicting a face at all, is indicated by a negative output value. If this were the case, the face detection and pose information could be derived directly from the SVM outputs. However, this ideal is hard to achieve, especially for input regions depicting a face just outside the pose range of an SVM. In reality, such image regions may produce relatively low, but positive output values. Thus, a definitive indication of the pose range could not be made easily. This is where the second stage neural network comes into play. The single neural network forming the second stage of the face detection system architecture acts as a "fusing" neural network that combines or fuses the outputs from each of the first stage SVMs. Whereas one SVM alone cannot provide a definitive indication of the face pose range of an input face region, collectively, they can when all their outputs are considered via the fusing inherent in a neural network.

As indicated previously, the system must be trained before detecting faces and identifying face poses in an input image can be attempted. The SVMs are trained individually first, and then the neural network is trained using the outputs of the SVMs. Each SVM is trained by sequentially inputting the feature vectors derived from the training images associated with the same pose range category—i.e., the category to which the SVM is to dedicated. As usual the corresponding elements of each feature vector are input into the same input nodes of the SVM. Interspersed with these face image feature vectors are so-called negative examples that the SVM is instructed are not face images. A negative example is a feature vector created in the same way as the face image feature vectors, except that the image used is not of a face exhibiting a pose within the range being associated with the SVM. Initially, the images associated with the negative example vectors preferably depict "natural" scenes not containing faces. However, a problem can arise in that there is no typical example of the negative class. In other words, the number of different scenes not depicting a face are nearly infinite. To overcome this problem, a "bootstrapping" technique is employed. First, it must be noted that the aforementioned training image feature vectors and negative example vectors are input into the SVM repeatedly until the output of the SVM stabilizes (i.e., does not vary outside a prescribed threshold between training iterations for each corresponding inputted vector). Bootstrapping comes into play by introducing face images that have poses that fall outside the designated range of the SVM being trained once the outputs have stabilized. The feature vectors produced from these images are fed into the SVM without any indication that they are negative examples. Whenever one of these negative examples derived from an "out-of-range" face image results in an output that indicates the face image is within the pose range associated with the SVM (i.e., a false alarm), the SVM is instructed that the input is a negative example. Such bootstrapping results in a more accurate SVM. The foregoing training procedure is repeated for each of the SVMs.

Once all the SVMs have been trained, the neural network is brought on-line and the set of feature vectors associated with each respective training image is, in turn, simultaneously input into the appropriate SVM. This is repeated until the outputs of the neural network stabilize. The sequence in which the feature vectors sets are input can be any desired. However, it is believed that inputting the vector sets in random pose range order will cause the neural network to stabilize more quickly. Finally, at least one face image feature vector set representing each pose range is, in turn, simultaneously input into the appropriate SVM, and the active output of the neural network is assigned as corresponding to a face being detected in an input image region and having the pose associated with the training image used to create the feature vector causing the output. The remaining neural network outputs (which will number at least one) are assigned as corresponding to a face not being detected in an input image region.

The system is now ready to accept prepared input image regions, and to indicate if the region depicts a face, as well as indicating the pose range exhibited by the face. To this end, the input image being searched is divided into regions. For example, a moving window approach can be taken where a window of a prescribed size is moved across the image, and at prescribed intervals, all the pixel within the window become the next image region to be tested for a face. However, it is not known what size a face depicted in an input image may be, and so the size of the window must be considered. One way of ensuring that a face of any practical size depicted in an input image is captured in the window is to adopt an image pyramid approach. In this approach the window size is selected so as to be the smallest practical. In other words, the window size is chosen to be the size of the smallest detectable face in an input image. This window size should also match the size chosen for the training face images used to train the system. For a tested embodiment of the present face detection system and process, a window size of 20 by 20 pixels was chosen. Of course, many or all of the faces depicted in an input image will likely be larger than the aforementioned window size. Thus, the window would only cover a portion of the bigger faces and detection would be unlikely. This is solved by not only searching the original input image with the search window (in order to find the "smallest" faces), but by also searching a series of reduce scaled versions of the original input image. For example, the original image can be reduced in scale in a stepwise fashion all the way down to the size of the search window itself, if desired. After each reduction in scale, the resulting image would be searched with the search window. In this way, larger faces in the original image would be made smaller and will eventually reach a size that fits into the search window.

Each input image region extracted in the foregoing manner from any scale version of the input image is abstracted in a way similar to the training images to produce a set of feature vectors, which are, in turn, simultaneously input into the appropriate SVMs. For each feature vector set input the system, an output is produced from the neural network having one active node. The active node will indicate first whether the region under consideration depicts a face, and secondly, if a face is present, into what pose range the pose of the face falls.

In an alternate embodiment of the foregoing search procedure, instead of using the input image (or scaled down versions thereof) directly and then abstracting each extracted region, the entire input image (or scaled down versions thereof) could be abstracted first and then each extracted region could be feed directly into the SVMs.

DESCRIPTION OF THE DRAWINGS

The specific features, aspects, and advantages of the present invention will become better understood with regard to the following description, appended claims, and accompanying drawings where:

FIG. 6B is a flow diagram depicting the continuation of the process shown in FIG. 6A.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
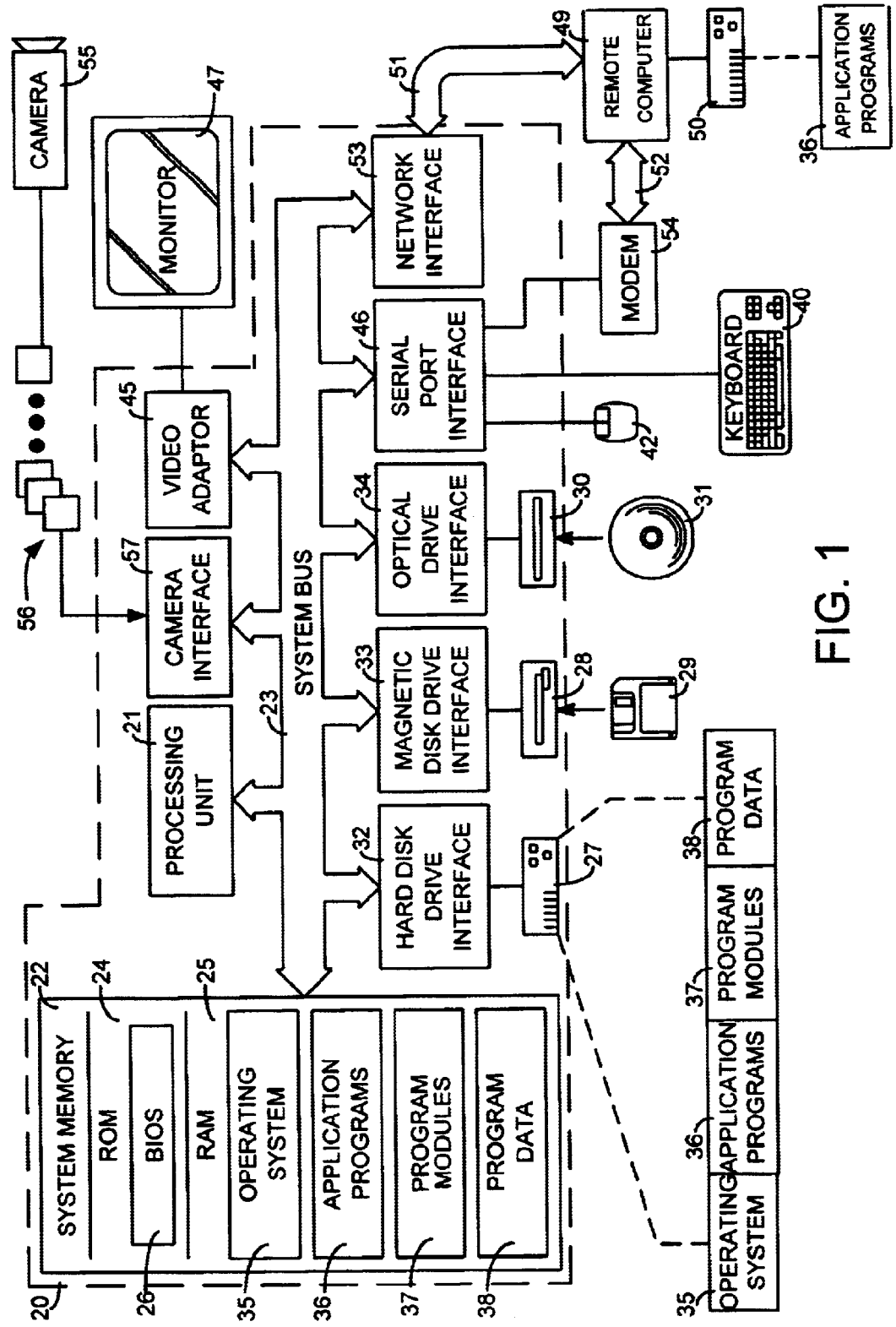
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining parts of this description section will be devoted to a description of the program modules embodying the invention.

1.0 Pose-Adaptive Face Detection System And Process

Figure 2:
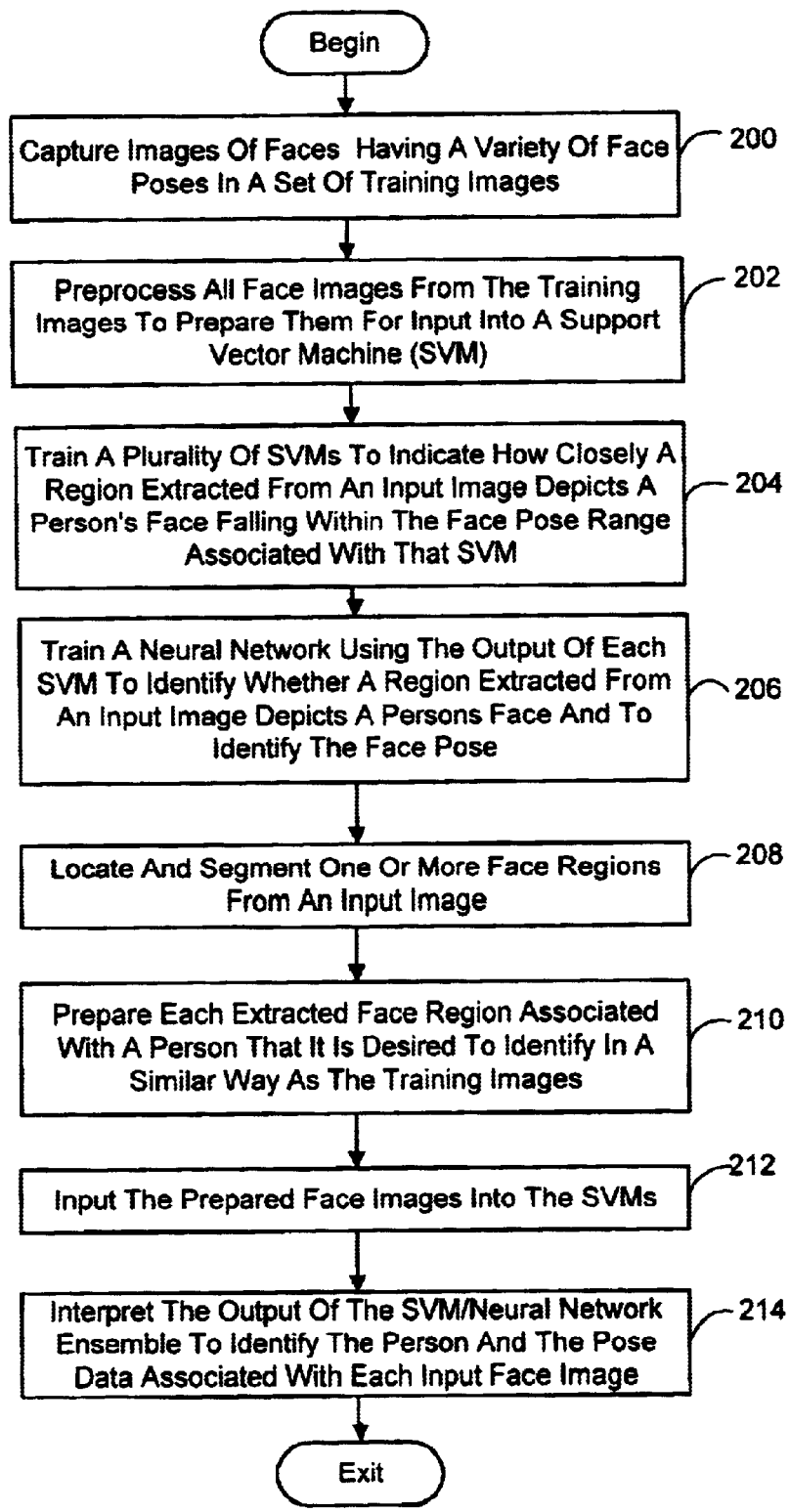
FIG. 2 is a diagram diagramming an overall face detection process for detecting a face depicted in an input image and the face pose of each detected person.

Generally, the pose-adaptive face detection process according to the present invention is accomplished via the following process actions, as shown in the high-level flow diagram of FIG. 2. The pose-adaptive face detection system and process must first be trained before it can detect face regions in an input image. This training phase generally involves first capturing images of the faces of a plurality of people (process action 200). As will be explained later, the captured face images will be used to train a series of Support Vector Machines (SVMs). Each SVM will be dedicated to a particular face pose, or more precisely a pose range. Accordingly, the captured face images should depict people having a variety of face poses. Only those face images depicting a person with face pose that falls within the particular pose range of a SVM will be used to train that SVM. In addition, the more face images of a particular face pose range that are used to train a SVM, the better it will ultimately be at detecting a face region in an input image exhibiting the same pose range, including those that do not depict the faces of people used as subjects for the training images. This is true up to a saturation limit where no further improvement in detecting capability is obtained. Thus, a sufficient number of training face images should be captured at each face pose range to ensure the various SVMs are trained to the desired level of detecting accuracy. It is believed that a SVM can be adequately trained by using anywhere from about 200 to 5000 different face images having face poses within the same range. In tested embodiments of the present invention, 1000 face images were employed to train a SVM with satisfactory results. It is also noted that the more diverse the training face images are, the more accurate the detecting capability of the SVM will become. Thus, it is preferred that the face images depict people who are not generally too similar in appearance. For example, capturing faces of people of different races, sexes and ages would be advantageous to ensure the best SVM accuracy possible is achieved. The training images can be captured in a variety of ways. One preferred method would involve positioning a subject in front of a video camera and capturing images (i.e., video frames) as the subject moves his or her head in a prescribed manner. This prescribed manner would ensure that multiple images of all the different face pose positions it is desired to identify with the present system are obtained.

All extracted face regions from the training images are preprocessed to prepare them for eventual input into the appropriate SVM (process action 202). In general, this will involve normalizing, cropping, categorizing and finally abstracting the face images. The prepared face image representations are next used to train a plurality of SVMs to generally indicate how closely a region extracted from an input image depicts a person's face exhibiting a face pose falling within the face pose range associated with that SVM (process action 204). In process action 206, the outputs from the SVMs are used to train a neural network to specifically identify whether a region extracted from an input image depicts a person's face, and if so to characterize the person's face pose. The system is then ready to accept prepared input face images for detection purposes and pose identification. To this end, the next process action 208 sequentially selects regions from an input image for processing. Each selected region is then abstracted in a way similar to the training images (process action 210) and input into the SVMs (process action 212). Finally, as indicated by process action 214, the output of the SVM/neural network is interpreted to determine whether the selected region depicts a face and if so the pose range into which it falls.

1.1 Preprocessing Image Regions

Figure 3:
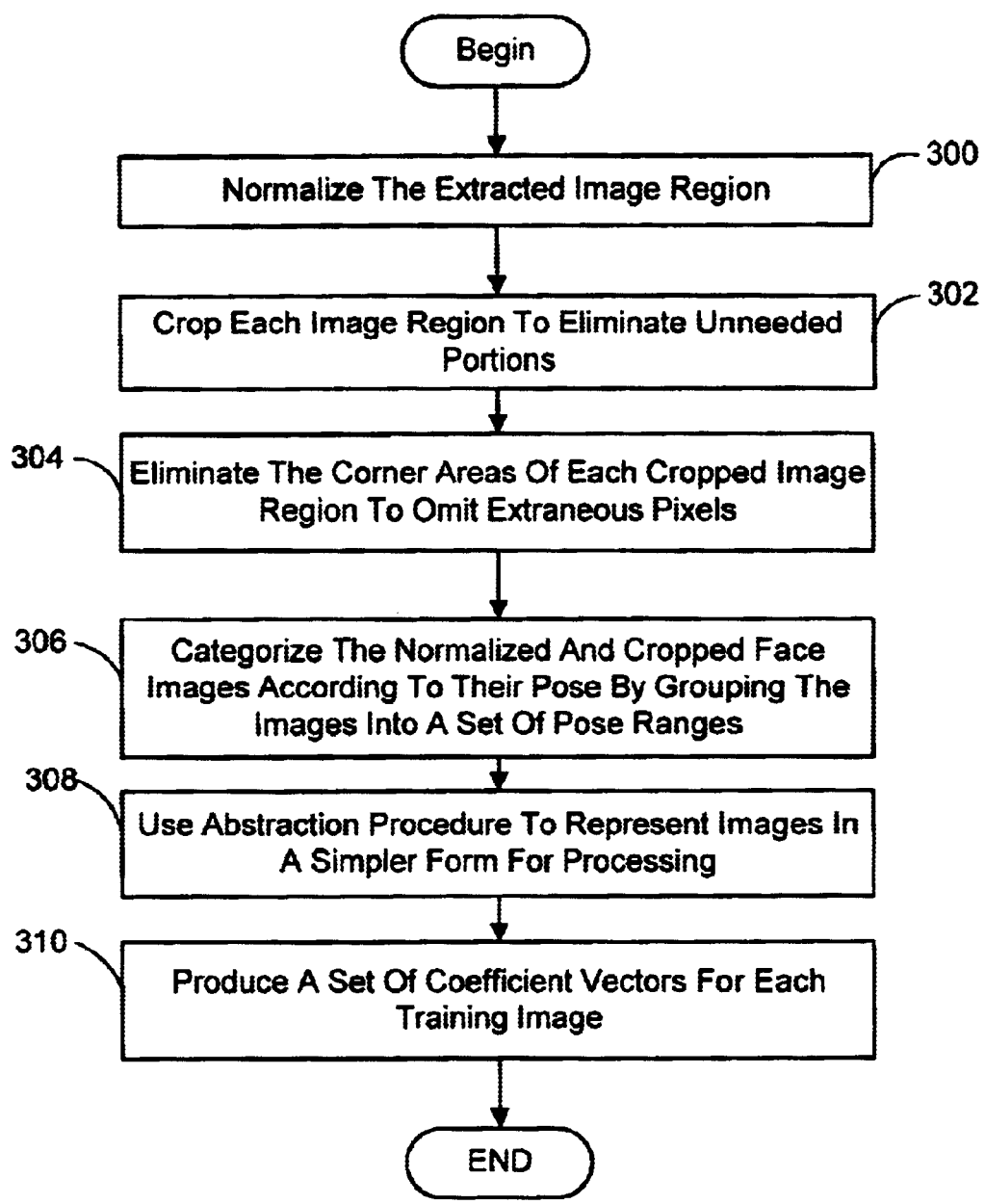
FIG. 3 is a flow diagram of a process for accomplishing the preprocessing module of the overall process of FIG. 2.

As mentioned above, the preprocessing action of the pose-adaptive face detection system involves normalizing, cropping, categorizing and abstracting the training images. Specifically, referring to FIG. 3, the preprocessing preferably entails normalizing the training images to a prescribed scale (processing action 300). Normalizing the training images entails normalizing the scale of the images. One conventional way of accomplished this task would be to detect the location of the person's eyes in the image and to compute the separation between these locations. The image would then be scaled based on a ratio between the computed eye separation distance and a prescribed "normal" eye separation. It is noted that this action could be skipped if the images are captured at the desired scale thus eliminating the need for resizing. The desired scale for the face images is approximately the size of the smallest face region expected to be found in the input images that are to be searched. In a tested embodiment of the present invention, an image size of about 20 by 20 pixels was used with success. The image could additionally be normalized in regards to the eye locations within the image. In other words, each image would be adjusted so that the eye locations fell within a prescribed area. These normalization actions are performed so that each of the training images generally match as to orientation and size. The images are also preferably cropped (process action step 302) to eliminate unneeded portions that could contribute to noise in the upcoming abstraction process. One way of performing the cropping is as follows. Essentially, the midpoint between the detected eye locations is calculated and any pixels outside a box surrounding the calculated midpoint are eliminating (i.e., the intensity is zeroed). It is noted that the distance from the detected midpoint to the left side of the box, and from the midpoint to the right side of the box, will vary depending on the face pose. For example, for frontal poses, the distance between the detected midpoint and the left and right side of the box will be the same. However, if the face pose is rotated from a frontal position, the distance from the midpoint to the left side would be different than from the midpoint to the right side as needed to ensure that the background and hair is not included in the cropped image. In addition, the corner areas of the box are eliminated to omit extraneous pixels depicting the background or hair from the resulting training face image (process action step 304). It is noted that the extracted regions could be cropped first and then normalized, if desired. It is also noted that a histogram equalization, or similar procedure, could be employed to reduce the effects of illumination differences in the image that could introduce noise into the modeling process.

The next process action 306 of the training image preprocessing involves categorizing the normalized and cropped images according to their pose. One preferred way of accomplishing this action is to group the images into a set of pose ranges. For example, in the tested embodiment to be described later, the images were assigned to one of seven ranges based on the pose yaw angle (i.e., $-35°$ to $-25°$, $-25°$ to $-15°$, $-15°$ to $-5°$, $-5°$ to $+5°$, etc.). It is noted that while the tested embodiment involved a specific example where only the pose yaw angle was varied between training images (while the pitch and roll angle were set at $0°$), this need not be the case. Rather, the persons in the training images could be depicted with any combination of pitch, roll and yaw angles, as long as at least a portion of their face is visible. In such a case, the normalized and cropped images would be categorized into pose ranges defined by all three directional angles. The size of these pose ranges will depend on the application and the accuracy desired, but can be readily determined and optimized via conventional means. An abstraction procedure is then used to represent the images in a simpler form to reduce the processing necessary (process action 308). Finally a set of coefficient (or feature) vectors is produced for each training image (process action 310). Each vector is tailored for input into a specific SVM as will be discussed in detail later.

The aforementioned abstracting procedure is essentially a method of representing the images in a simpler form to reduce the processing load associated with the SVMs detection operation. This abstraction process is further detailed in FIGS. 4A and 4B. While many abstraction processes might be employed for this purpose (e.g., histograming, Hausdorff distance, geometric hashing, active blobs, eigenface representations, and others), the preferred method entails the use of wavelet transforms, and particularly the use of three types of non-standard Haar wavelet transforms to represent each normalized, cropped, and categorized training face image.

Figure 4A:
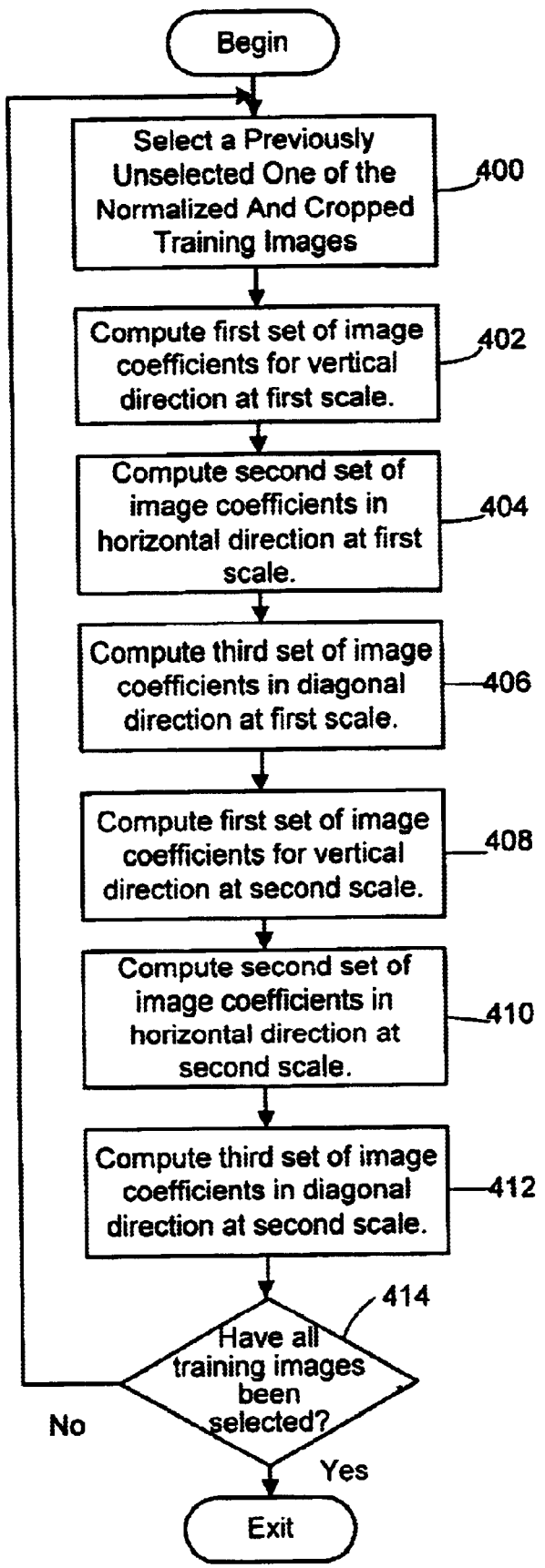
FIG. 4A is a flow diagram of a process for accomplishing, in part, the abstraction procedure of FIG. 3.

As discussed in Oren [5], an image representation which captures the relationship between average intensities of neighboring image regions is produced using a family of basis functions, specifically Haar wavelets, which encode such relationships along different orientations. To this end, three types of 2-dimensional Haar wavelets are employed. These types include basis functions which capture change in intensity along the horizontal direction, the vertical direction and the diagonals (or corners). Referring to FIG. 4A, the abstraction process entails selecting one of the normalized, cropped and categorized training images (process action 400). A first set of image coefficients is then computed from the selected training image using a Haar wavelet procedure which encodes the relationship between average intensities of the pixels of neighboring image regions to a 4×4 scale in the vertical direction (process action 402). A second set of image coefficients is then computed from the selected training image using a Haar wavelet procedure designed to produce coefficients at the 4×4 scale in the horizontal direction (process action 404). A third set of image coefficients is also computed from the selected image, this time using a Haar wavelet procedure designed to produce coefficients at the 4×4 scale in a diagonal direction (process action 406). This process of computing sets of image coefficients is then repeated using the same three Haar wavelet procedures (i.e., vertical, horizontal and diagonal) except this time at a 2×2 scale (process 408 to 412). It is then determined if the last training image has been selected (process action 414). If not, process actions 400 through 412 are repeated for each remaining training images.

The use of the above-described wavelet transforms has several advantages. For example, both the training images used to train the system and the input images it is desired to search for faces, can be simple gray scale images. In addition, it is believed that the wavelet transforms result in a very fast and accurate detection process. The result of the wavelet transform process is a series of coefficients.

For each face pose range, a particular sub-set of the average coefficients from each training image are selected to form a so-called feature vector. The same number of average coefficients from each training image is preferably used to make up each feature vector. The feature vector associated with each face pose range will be made up of a different combination of the average coefficients. Thus, each training image will be represented by a unique set of the computed feature vectors—one tailored for each face pose range.

Figure 4B:
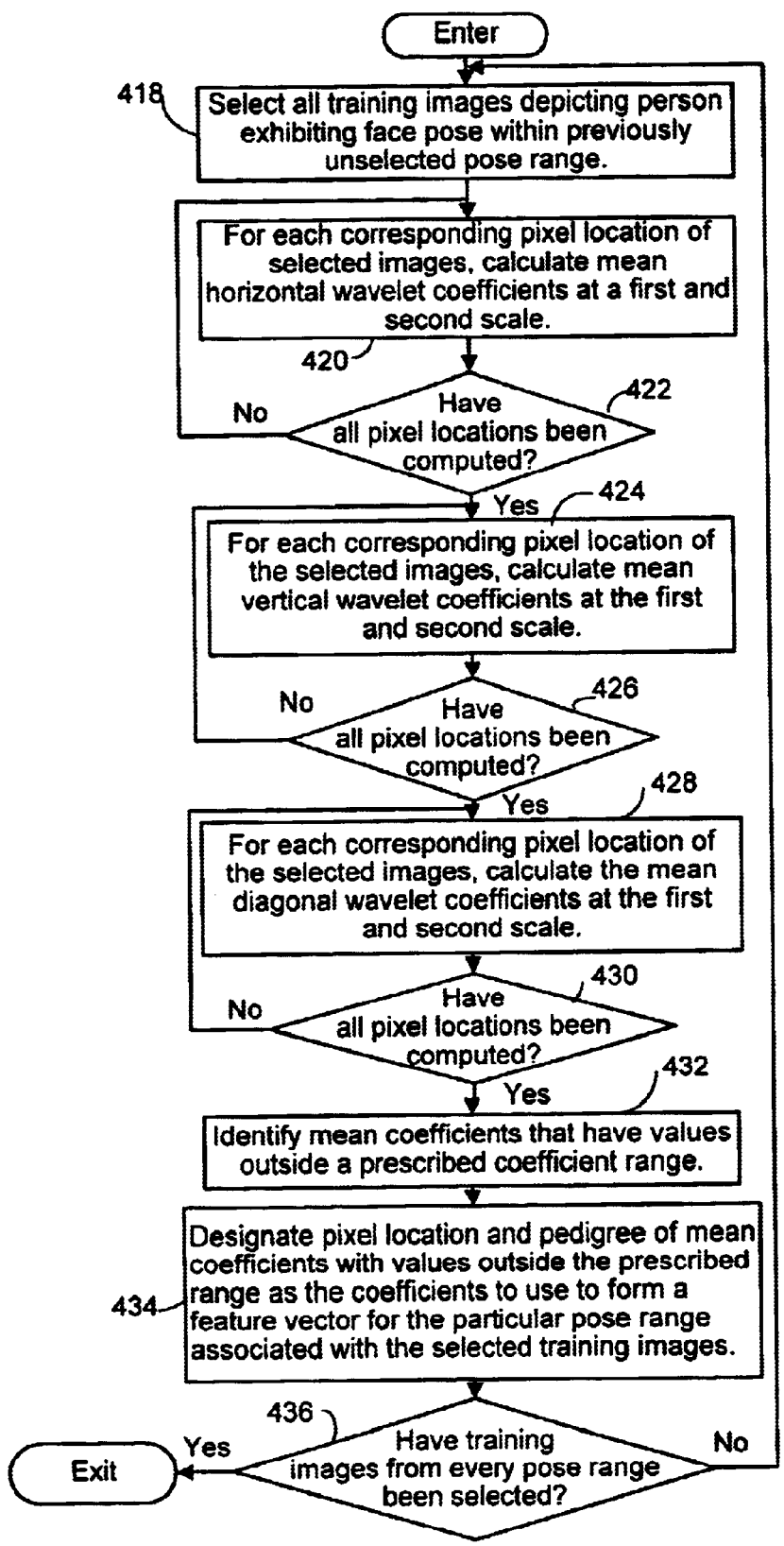
FIG. 4B is a flow diagram depicting the continuation of the abstraction procedure shown in FIG. 4A.

Referring to FIG. 4B, this tailoring process begins by calculating the mean coefficients of all the training images. To this end, all the training images depicting a person exhibiting a face pose within a particular pose range are selected (process action 418). The mean of all the horizontal wavelet coefficients associated with a particular pixel location of the selected training images that were computed under the first scale (e.g., 4×4), and the mean of all the horizontal wavelet coefficients associated with the pixel location that were computed under the other scale (e.g., 2×2), are calculated (process action 420). It is noted that the normalizing and cropping steps described previously will create training images having the same size, and so the same number of corresponding pixel locations. Process action 420 is then repeated for each pixel location of the images as indicated by process action 422. This process of computing the means of the wavelet coefficients associate with both scales for each pixel location is then repeated for the vertical wavelet coefficients (process actions 424 and 426) and the diagonal wavelet coefficients (process actions 428 and 430). Thus, once all the coefficient means have been computed, there will be two average horizontal coefficients (i.e., one for each scale), as well as two average vertical and two average diagonal coefficients, associated with each pixel location of the training images. Those mean coefficients that have values outside a prescribed coefficient range are identified as indicated in process action 432. The pixel location and pedigree (i.e., direction and scale) of the identified mean coefficients are then designated as the coefficients that will be used to form a feature vector for the particular pose range associated with the selected training images (process action 434). For example, suppose a mean horizontal wavelet coefficient computed under the 4×4 scale, which is associated with a pixel of the frontal pose range training images that depicts an area to the side of the nose of the faces, falls outside the prescribed coefficient range. In that case, whenever a feature vector is generated that is to be associated with the frontal pose range, it will include the horizontal wavelet coefficient which was computed under the 4×4 scale for the pixel at the aforementioned nose region pixel location. The foregoing selection process is repeated for the training images depicting faces exhibiting each of the remaining pose ranges as indicated by process action 436. In this way a specific group of wavelet coefficients, as would be derived from any image undergoing the previously-described abstraction process, are identified for inclusion in a feature vector representing each of the pose ranges.

A preferred coefficient range that can be used to determine which of the mean wavelet coefficients will define one of the feature vector elements for a particular pose range was determined by analyzing the response profiles of the wavelet transformed training images. It was observed that there was a strong response (i.e., a distinct change in intensity in comparison to neighboring pixels) in the coefficients associated with pixels to the sides of the nose, mouth and eyes and so had a relatively large average coefficient value, whereas a weak response was observed in the coefficients associated with pixels along the cheek and forehead areas of the face and so had a relatively low average coefficient value. In contrast, the average coefficient values derived from pixels of non-face images tended to be in-between the values associated with the aforementioned strong and weak responses typifying a face image. This occurs because the corresponding pixels in non-face images are random in intensity and did not share any common pattern. This dichotomy was exploited to define the aforementioned preferred coefficient range. Essentially average coefficient values of pixel locations that either fall above or below the defined coefficient range would be considered as indicative of the distinguishing features of a face exhibiting a pose within a particular pose range, whereas average coefficient values of pixel locations falling within the coefficient range where deemed too ambiguous and so not reliable as an indicator of the distinguishing features of the face. In tested embodiments of the pose-adaptive face detection system and process, it was determined that average coefficient values which exceeded an upper threshold of between about 1.4 to 1.6, and those below a lower threshold of between about 0.4 to 0.6 were indicative of facial features, while those in between these thresholds were to ambiguous to be considered as indicative of facial features. Here the upper and lower threshold is given without coefficients normalization. Thus, as described above, only those mean coefficients that have values outside the prescribed coefficient range are identified and used to define the pixel location and pedigree of the coefficients that will be used to form a feature vector for a particular pose range. For example, in the aforementioned tested embodiments, the foregoing selection process resulted in the selection of 48 wavelet coefficient locations/pedigrees under the 2×2 scale and 8 under the 4×4 scale to be used to define the elements of a feature vector representing the image of a face within a defined frontal pose range (of −5° to +5° yaw, with 0° pitch and roll).

Figure 5:
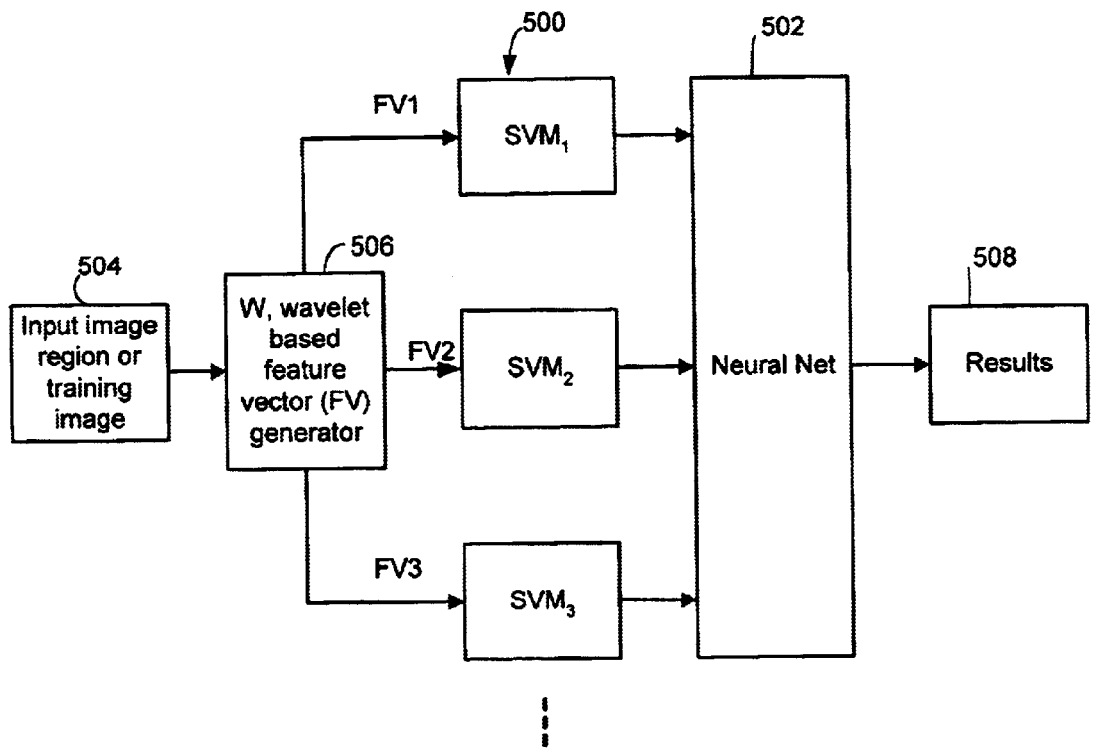
FIG. 5 is a block diagram of a SVM/neural network architecture that could be employed to accomplish the overall process or FIG. 2.

2.0 Training the SVMs and Neural Network to Detect Faces and Identify Face Poses Referring to FIG. 5, the prepared face image representations are used to train a 2-stage classifier which includes a bank of SVMs, 500, as an initial pre-classifier layer, and a neural network, 502, forming a subsequent decision classifier layer.

As will be discussed in greater detail later, a region of a training image (or region of an input image) 504 is input into a wavelet-based feature generator 506 that generates coefficients using the previously discussed Haar wavelet method. Coefficients generated by this wavelet method are in turn selected to make feature vectors FV1, FV2, FV3 and so on, which are tailored for each pose range (and so each SVM) as discussed previously. The feature vectors are then input into the respective SVMs 500 whose output is fed to the neural net 502 yielding an indication or results 508 which are interpreted to determine whether the input image contains a face, and if so identifying the face pose range of the detected face.

The bank of SVMs 500 is composed of a plurality of SVMs each of which is trained to detect faces exhibiting a particular range of poses. To this end, the output of each SVM would indicate whether an input image region is a face having a pose within the SVM's range, or it is not. While this output could be binary (i.e., yes or no), it is preferred that a real-value output be produced. Essentially, the real-value output of each SVM pre-classifier is indicative of the distance of an input feature vector associated an input image region from a decision hyperplane defined by the face images used to train the SVM. In other words, the output indicates how closely an input feature vector fits into the face class represented by the SVM. The number of input units or nodes of each SVM equals the number of elements making up each feature vector fed into it. This is because the vector elements are input into respective ones of these input units. Each SVM has only one output as indicated previously. Ideally, each SVM would be configured such that an image region that is not a face exhibiting a pose range associated with the SVM, or not depicting a face at all, is indicated by a negative output value. If this were the case, the face detection and pose information could be derived directly from the SVM outputs. However, this ideal is hard to achieve, especially for input regions depicting a face just outside the pose range of an SVM. In reality, such image regions may produce relatively low, but positive output values. Thus, a definitive indication of the pose range could not be made easily. This is where the second stage neural network 502 comes into play. The single neural network forming the second stage of the face detection system architecture acts as a "fusing" neural network that combines or fuses the outputs from each of the first stage SVMs. Whereas one SVM alone cannot provide a definitive indication of the face pose range of an input face region, collectively, they can when all their outputs are considered via the fusing inherent in a neural network. Structurally, the output from each of the SVMs is fed into each input of the neural network. The number of input units of the neural network is therefore equal to the number of SVMs. The number of outputs of the neural network equals the number of input units, plus at least one more. The extra output(s) is used to indicate that an input image region does not depict a face of any pose the system has been trained to detect. Thus, since the number of outputs of the neural network exceeds the number of SVMs in the system, there will be enough to allow a separate output to represent each detected face at a particular one of the pose range groups and at least one extra to indicate no face was detected. As a consequence, it can be advantageous for the output layer of the fusing neural network to include a competition sub-layer that allows only one output node to be is active in response to the input of a feature vector into the SVMs. In this way a single output node will be made active, which will represent that the face is depicted in the region of the input image under consideration and that that face exhibits a pose within a particular pose range. Thus, an output vector of a system having three SVMs might look like [1, 0, 0, 0] where the first element represent the active node. Alternately, the output could be a two element vector where the first element indicates whether a face was detected or not, and the magnitude of the second element indicates the pose range. Finally, it is noted that the number of hidden layer units or nodes in the neural network is determined empirically.

Figure 6A:
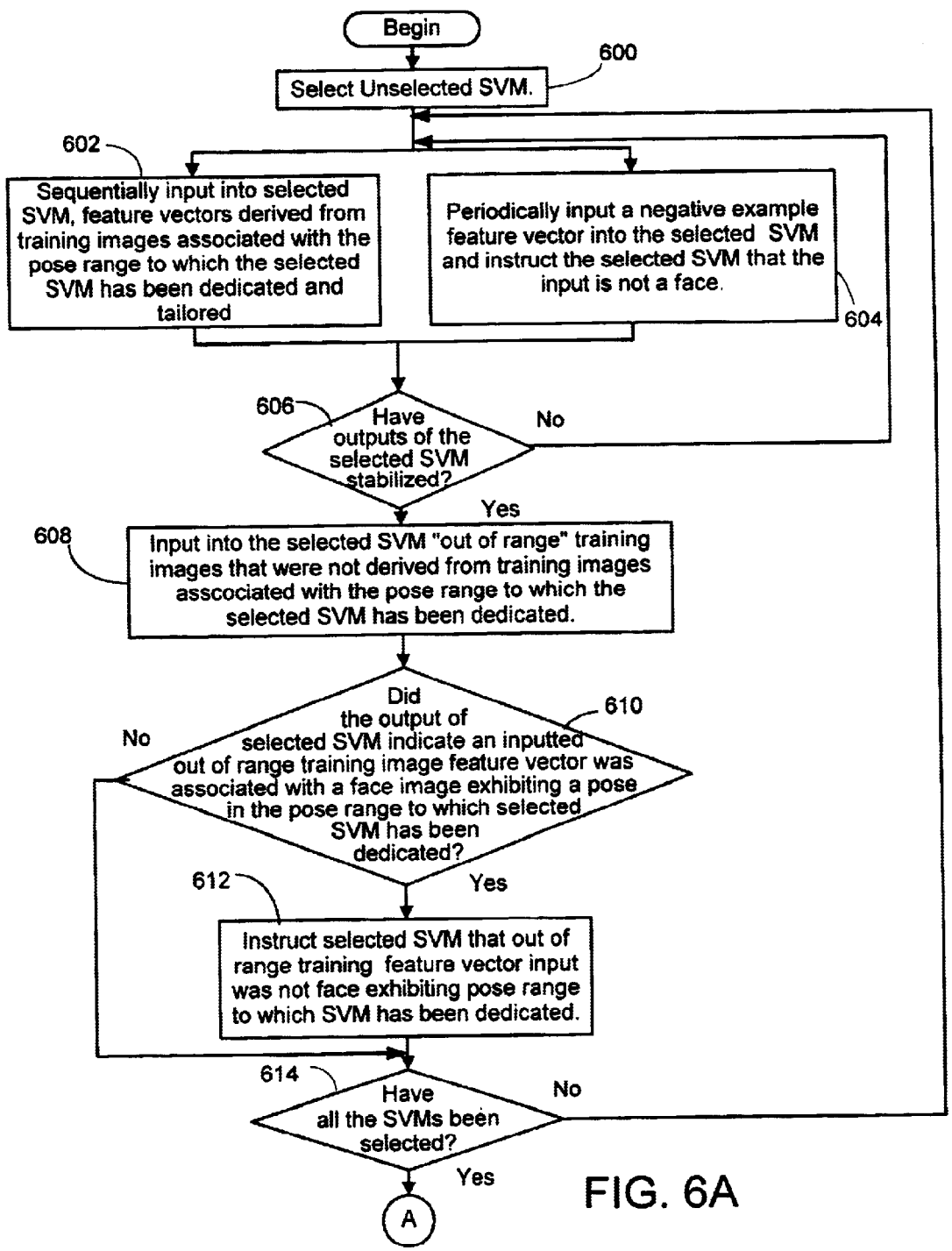
FIG. 6A is a flow diagram of a process for the SVM and neural network training modules of the overall process of FIG. 2.

As indicated previously, the system must be trained before it can attempt to detect faces and identified face poses in an input image. As shown in FIGS. 6A and 6B, the SVMs are trained individually first, and then the neural network is trained using the outputs of the SVMs. As shown in FIG. 6A, in process action 600, a SVM is selected. The selected SVM is trained by sequentially inputting the feature vectors derived from the training images exhibiting faces in the same pose range category to which the SVM is to dedicated and which have been tailored to that range (process actions 602). As usual the corresponding elements of each feature vector are input into the same input nodes of the SVM. Interspersed with these face image feature vectors are so-called negative examples that the SVM is instructed are not face images. A negative example is a feature vector created in the same way as the face image feature vectors, except that the image used is not of a face. The images associated with the negative example vectors preferably depict "natural" scenes not containing faces. Thus, in process action 604, negative example feature vectors are periodically input into the selected SVM between inputs of the training image feature vectors that were derived using the same image coefficients chosen to create the training image feature vectors for the pose range to which the selected SVM has been dedicated. The selected SVM is instructed that this negative input is not a face. However, a problem can arise in that there is no typical example of the negative class. In other words, the number of different scenes not depicting a face are nearly infinite. To overcome this problem, a "bootstrapping" technique is employed. First, as indicated in process action 606, the aforementioned training image feature vectors and negative example vectors are input into the SVM repeatedly until the output of the SVM stabilizes (i.e., does not vary outside a prescribed threshold between training iterations for each corresponding inputted vector Bootstrapping comes into play by introducing face images that have poses that fall outside the designated range of the SVM being trained once the outputs have stabilized. The feature vectors produced from these images are fed into the SVM without any indication that they are out of range. Thus, in process action 608, whenever it is determined one of these feature vectors derived from an "out-of-range" face image results in an output that indicates the face image is within the pose range associated with the SVM in process action 610 (i.e., a false alarm), the SVM is instructed that the input is out of range (process action 612). Such bootstrapping results in a more accurate SVM. The foregoing training procedure is repeated for each of the SVMs as indicated in process action 614.

A As shown in FIG. 6B, once all the SVMs have been trained, the neural network is brought on-line (process action 616) and the set of feature vectors associated with each respective training image is, in turn, simultaneously input into the appropriate SVM (process action 618) based on the pose range associated with the feature vector. This is repeated until the outputs of the neural network stabilize (process action 620). The sequence in which the feature vectors sets are input can be any desired. However, it is believed that inputting the vector sets in random pose range order will cause the neural network to stabilize more quickly. Finally, at least one face image feature vector set representing each pose range is, in turn, simultaneously input into the appropriate SVM, and the active output of the neural network is assigned as corresponding to a face being detected in an input image region and having the pose range associated with the training image used to create the feature vector causing the output (process action step 622). The remaining neural network outputs (which will number at least one) are assigned as corresponding to a face not being detected in an input image region.

Figure 7:
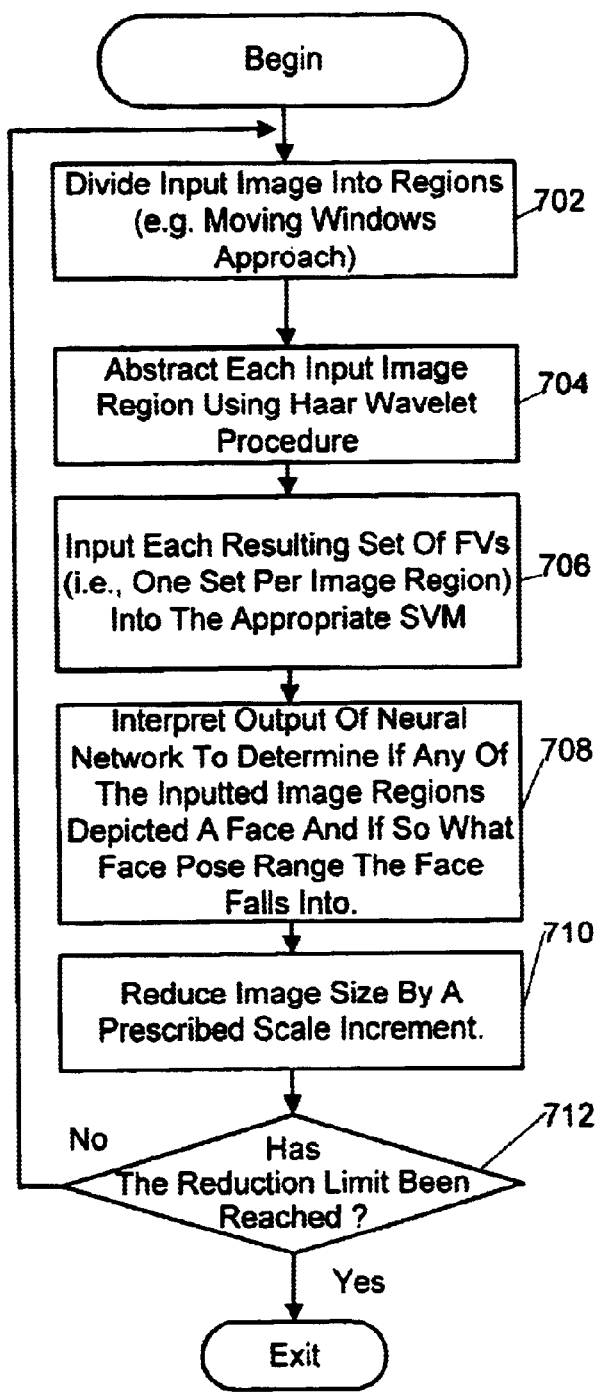
FIG. 7 is a flow diagram of a process for accomplishing the program modules of the overall process of FIG. 2 for detecting face images and identifying associated face poses by inputting an image into a SVM/neural network ensemble.

3.0 Using the Pose Adaptive Detection System to Detect Faces and Identify Face Poses The system is now ready to accept prepared input image regions, and to indicate if the region depicts a face, as well as indicating the pose range exhibited by the face. Referring to FIG. 7, the input image being searched is divided into regions (process action 702). For example, a moving window approach can be taken where a window of a prescribed size is moved across the image, and at prescribed intervals, all the pixels within the window become the next image region to be tested for a face.

Each input image region extracted in the foregoing manner from the input image is abstracted in a way similar to the training images (process action 704), to produce a set of feature vectors which are, in turn, simultaneously input into the appropriate SVMs (process action 706). Specifically, for each input image region, a group of image coefficients are generated using the previously described Haar wavelets for the horizontal, vertical and diagonal directions at two different scales (e.g., 4×4 and 2×2). As discussed previously, certain ones of the image coefficients are selected for each pose range. The selected coefficients are then used to form a feature vector associated with a particular pose range. In this case, feature vectors corresponding to each pose range are formed from the image coefficients derived from the input image region. Thus, the abstraction procedure results in a set of feature vectors (i.e., one for each pose range group) for each input image region. These feature vectors are input into the SVMs as indicated above. To accomplish this, each feature vector associated with an input image region is simultaneously input into the SVM that is dedicated to the same pose range as the feature vector. For each feature vector set input, an output is produced from the neural network which will have just one active node. The active node is interpreted to ascertain first whether the region under consideration depicts a face, and secondly, if a face is present, into what pose range the pose of the face falls (process action 708).

However, it is not known what size a face depicted in an input image may be, and so the size of the aforementioned window used to define each input image region must be considered. One way of ensuring that a face of any practical size depicted in an input image is captured in the window is to adopt an image pyramid approach. In this approach the window size is selected so as to be the smallest practical. In other words, the window size is chosen to be the size of the smallest detectable face in an input image. This window size should also match the size chosen for the training face images used to train the system. For a tested embodiment of the present face detection system and process, a window size of 20 by 20 pixels was chosen. Of course, many or all of the faces depicted in an input image will likely be larger than the aforementioned window size. Thus, the window would only cover a portion of the larger faces and detection would be unlikely. This is solved by not only searching the original input image with the search window (in order to find the "smallest" faces), but by also searching a series of reduced scale versions of the original input image. For example, the original image can be reduced in scale in a stepwise fashion all the way done to the size of the search window itself, if desired. After each reduction in scale, the resulting image would be searched with the search window. In this way, larger faces in the original image would be made smaller and will eventually reach a size that fits into the search window. To this end, the input image size is reduced by a prescribed scale increment (process action 710). This scale increment is chosen so that it is not so large that faces are missed, but not so small that the processing of the image regions is unnecessarily increased. It is then determined in process action 712 whether a reduction limit has been reached. Any desired limit could be chosen and would preferably be based on the largest face expected to be depicted in an input image. The limit could be when the image is reduced to the size of the search window itself. However, this may result in unnecessary processing if it is not believed a face will take up the entire input image. If the reduction limit has not been reached process actions 702 through 710 are repeated. This continues until the limit is reached.

In an alternate embodiment of the foregoing search procedure, instead of using the input image (or scaled down versions thereof) directly and then abstracting each extracted region, the entire input image (or scaled down versions thereof) could be abstracted first and then each extracted region could be feed directly into the SVMs. It is believed that this alternate procedure could increase the efficiency of the face detection system in some applications.

As an example of the foregoing process, suppose a region of one of the scaled input images depicts a full frontal view (i.e., pitch, yaw and roll are all 0 degrees) of the face of a subject. The image region is first preprocessed for entry into the SVMs and transformed into a series of feature vectors in the manner described previously. The feature vectors are simultaneously and respectively input into the appropriate SVMs. Suppose there are three SVMs—one dedicated to a frontal pose range of −5° to 5°, the second dedicated to a pose range of −5° to −15°, and the third dedicated to a pose range of 5° to 15°. Also, suppose the raw output from the SVMs forms the vector [0.5, −0.3, 0.1]. This would indicate the face pose is highly frontal, decidedly not close to the −5° to −15° range, but very close to the 5° to 15° range. These values would be fed into each input of the neural network. In the present example, this should result in an output vector from the neural network of [1, 0, 0, 0] where the first element has been assigned to a detected face region having a pose within the frontal pose range. Note that the last element in the neural network output vector corresponds to the negative class. Now suppose the input image region did not depict a face with a pose that the system has been trained to detect, which includes the case where the region does depict a face but not one detectable at the current scale. The output vector of the SVMs might be [−0.1, −0.2, −0.5]. In that case, the output vector generated by the neural network should be [0, 0, 0, 1], where the last element indicates the image region does not contain a face or at least not a face having a pose that falls within a pose range that the system has been trained to detect.

It should be noted that while the foregoing description specifically described a system and process for detecting faces, the present invention is not limited to just that embodiment. Rather, the detection system could be trained to detect objects in an image other than a face using the same methods.

References

[1] T. Cootes, G. Edwards, and C. Taylor, "Active Appearance Models," ECCV.
[2] D. Beymer, "Face Recognition Under Varying Pose," AI Memo 1461.
[3] D. Beymer and T. Poggio, "Face Recognition From One Model View," Proc. Fifth Int'l Conf. Computer Vision, 1995.
[4] T. Vetter and T. Poggio, "Linear Object Classes and Image Synthesis From a Single Example Image," IEEE Trans PAMI.
[5] Oren M, Papageorgion C, Sinha P, Osuma E, Poggio T Pedestrian Detection Using Wavelet Templates, In IEEE CVPR, June 17–19, Year?.

Wherefore, what is claimed is:

1. A computer-implemented face detection process for detecting a person's face in an input image and identifying a face pose range into which the face pose exhibited by the detected face falls, comprising using a computer to perform the following process actions:

creating a database of a plurality of training image feature characterizations, each of which represents the face of a person at a known face pose;

training a plurality of support vector machines (SVMs), each of which is dedicated to a particular range of face poses, to indicate how closely a region extracted from an input image depicts a person's face exhibiting a face pose falling within the face pose range associated with that SVM, using said training image feature characterizations, which are abstracted so as to represent said images in simpler form for processing wherein said abstraction comprises:

deriving a group of image coefficients from each training image that characterize the image in a manner that distinguishes the image from other images depicting faces at a different pose range; and for each training image, selecting among the coefficients of the group of coefficients derived from the training image to form a set of feature vectors, each of which is tailored to a specific face pose range, wherein the same selection criteria is used to select the coefficients associated with training images belonging to the same pose range;

training a neural network having inputs which are in communication with the output of each SVM to identify, using the SVM outputs, whether a region extracted from an input image depicts a person's face, and whenever the extracted region is identified as depicting a person's face, indicating the face pose range into which the face pose of the identified face falls; and respectively inputting image feature characterizations derived from each of a series of regions extracted from an input image into the SVMs, so as to cause the neural network to identify whether the extracted region depicts a person's face, and whenever the extracted region is identified as depicting a person's face, to indicate the face pose range into which the face pose of the identified face falls.

2. The process of claim 1 wherein the process action of creating a database comprises the actions of:

capturing training images of faces of a plurality of people at a variety of face poses; and preprocessing said images to prepare them for input into the Support Vector Machines (SVMs).

3. The process of claim 2 wherein the process action of preprocessing the images to prepare them for input into the SVMs comprises the actions of:

normalizing each training image by resizing it to a prescribed scale if not already at the prescribed scale and adjusting the region so that the eye locations of the depicted subject fall within a prescribed area;

cropping each training image to eliminate unneeded portions not specifically depicting part of the face of the subject;

categorizing the normalized and cropped training images according to their face pose by grouping the images into a set of pose ranges;

abstracting said training images to create said training image feature characterizations so as to represent said images in a simpler form for processing.

4. The process of claim 3 wherein the process action of abstracting the training images comprises, for each training image in turn, the actions of:

computing a first set of image coefficients for the normalized and cropped training image using a Haar wavelet procedure which encodes the relationship between average intensities of the pixels of neighboring image regions to a first scale in a vertical direction computing a second set of image coefficients for the normalized and cropped training image using a Haar wavelet procedure which encodes the relationship between average intensities of the pixels of neighboring image regions to a first scale in a horizontal direction;

computing a third set of image coefficients for the normalized and cropped training image using a Haar wavelet procedure which encodes the relationship between average intensities of the pixels of neighboring image regions to a first scale in a diagonal direction;

computing a fourth set of image coefficients for the normalized and cropped training image using a Haar wavelet procedure which encodes the relationship between average intensities of the pixels of neighboring image regions to a second scale in a vertical direction;

computing a fifth set of image coefficients for the normalized and cropped training image using a Haar wavelet procedure which encodes the relationship between average intensities of the pixels of neighboring image regions to a second scale in a horizontal direction;

computing a sixth set of image coefficients for the normalized and cropped training image using a Haar wavelet procedure which encodes the relationship between average intensities of the pixels of neighboring image regions to a second scale in a diagonal direction; and using a selection criteria designed for the particular pose range associated with the training image, selecting a group of image coefficients from said first through sixth sets thereof to form a feature vector for input into the particular SVM associated with the pose range.

5. The process of claim 4, wherein the process action of selecting a group of image coefficients from the first through sixth sets thereof to form each feature vector of the set of feature vectors associated with each training image comprises the actions of:

(a) selecting all the training images depicting a person exhibiting a pose falling into the same one of the pose ranges;

(b) respectively computing the mean of all the first scale horizontal wavelet coefficients associated with each pixel location of the selected training images;

(c) respectively computing the mean of all the second scale horizontal wavelet coefficients associated with each pixel location of the selected training images;

(d) respectively computing the mean of all the first scale vertical wavelet coefficients associated with each pixel location of the selected training images;

(e) respectively computing the mean of all the second scale vertical wavelet coefficients associated with each pixel location of the selected training images;

(f) respectively computing the mean of all the first scale diagonal wavelet coefficients associated with each pixel location of the selected training images;

(g) respectively computing the mean of all the second scale diagonal wavelet coefficients associated with each pixel location of the selected training images;

(h) identifying all the computed mean coefficient values having values outside a prescribed coefficient range, wherein mean coefficient values greater that the prescribed coefficient range and less than the prescribed coefficient range are indicative of distinguishing features of a face exhibiting a pose falling within the pose range of the selected training images, whereas mean coefficient values found within the prescribed coefficient range cannot be relied upon as indicative of the distinguishing features of a face exhibiting a pose falling within the pose range of the selected training images;

(i) designating the pixel location and pedigree of each identified mean coefficient value as a pixel location and pedigree of an image coefficient derived from a training image that is used as an element of the feature vector associated with the pose range of the selected training images, wherein the pedigree of a coefficient value refers to its associated direction and scale; and (j) repeating process actions (a) through (i) for each of the remaining pose ranges.

6. The process of claim 1 wherein the process action of training a plurality of SVMs comprises the actions of:
for each SVM,
sequentially inputting into the inputs of the SVM the primary feature vectors of the training images depicting faces exhibiting a pose within the pose range to which the SVM has been dedicated, wherein a primary feature vector is one which has been tailored to the pose range of the SVM being trained, and repeating the feature vector inputting action until the output of the SVM stabilizes.

7. The process of claim 6 further comprising the process actions of:

interspersing negative example feature vectors with the sequentially inputted feature vectors in each SVM during training, wherein said negative example feature vectors are generated by abstracting images not depicting faces in the same manner as the training images to create a set of negative example feature vectors, and wherein only negative example feature vectors produced from image coefficients selected using the selection criteria associated with a particular face pose range are input into a SVM dedicated to that pose range; and instructing the SVMs that an inputted negative example is not a face.

8. The process of claim 6, further comprising the process action of:

once the outputs of the SVMs stabilize, inputting out of range training image feature vectors into the SVM wherein said out of range feature vectors are feature vectors of a training image that does not depict a face having a pose within the face pose range that the SVM into which they are inputted is dedicated to; and whenever the output of a SVM indicates an out of range feature vector is associated with an image depicting a face within the face pose range the SVM is dedicated to, instructing the SVM that the out of range feature vector does not represent a face in the face pose range to which the SVM is dedicated.

9. The process of claim 6 wherein the process action of training the neural network comprises the actions of:

bringing the neural network on line so as to be in communication with the outputs of the SVMs;

for each set of feature vectors generated from each training image, simultaneously inputting each feature vector of the set of feature vectors into the SVM dedicated to the pose range associated with the feature vector; and repeating the simultaneous feature vector inputting action until the outputs of the neural network stabilize.

10. The process of claim 9, further comprising performing, once the neural network outputs have stabilized, the process actions of:

(a) for a set of feature vectors generated from a training image, simultaneously inputting each feature vector of the set into the SVM dedicated to the pose range group associated with the feature vector;

(b) designating that the resulting output of the neural network is indicative of an input image region that depicts a person's face and has a face pose falling within the face pose range associated with the training image used to generate the set of feature vectors;

(c) repeating the process actions (a) and (b) until a set of feature vectors representative of a training image from each face pose range has been simultaneously inputted into the SVM and the neural network output designated for each;

(d) designating any remaining undesignated output states the neural network is capable of producing as indicative of an output image region that either does not depict a face or does not depict a face exhibiting a face pose range that the face detection process has been trained to identify.

11. The process of claim 1, wherein the process action of inputting image feature characterizations derived from each of a series of regions extracted from an input image comprises the actions of:

(a) extracting a region from the input image;

(b) abstracting the image region to create image feature characterizations thereof, wherein said abstracting is done in a same manner as employed to create said image feature characterizations of each training image;

(c) inputting the image feature characterizations derived from the input image region into the SVMs;

(d) interpreting the output of the neural network to determine if the input image region depicts a face and if so indentifying the face pose range into which the face falls; and (e) repeating process actions (a) through (d) until regions from every part of the input image it is desired to screen for faces has been extracted and processed.

12. The process action of claim 11, wherein the process action of extracting a region from the input image comprises the action of:

progressively shifting a search window across the input image and prior to each shift extracting the pixels contained within the search window to create an input image region.

13. The process of claim 12, further comprising the process actions of:

employing a search window having a size approximately equal to the size of the smallest face it is anticipated will be depicted in the input image and which it is desired to detect;

after regions from every part of the input image it is desired to screen for faces have been extracted, reducing the size of the input image by a prescribed scale increment;

progressively shifting the search window across the reduced input image and prior to each shift extracting the pixels contained within the search window to create an input image region; and repeating the reducing and shifting process actions until a prescribed reduction limit is reached.

14. The process of claim 13, wherein the search window size corresponds to the size of the training images.

15. The process of claim 12 wherein the abstracting process action comprises the actions of:

deriving a group of image coefficients that characterize the input image region in the same manner as the training images were characterized; and using the same selection criteria employed with the image coefficients derived from the training images to form a set of feature vectors for the input image region, each of which is associated with a specific face pose range.

16. The process of claim 15, wherein the process action of inputting the image feature characterizations comprises the action of simultaneously inputting each feature vector of the set of feature vectors derived from the input image region into the SVM dedicated to the pose range associated with the feature vector.

17. A computer-readable memory for detecting faces in an image and identifying their pose, comprising:

a computer-readable storage medium; and a computer program comprising program modules stored in the storage medium, wherein the storage medium is so configured by the computer program that it causes a computing device to, create a training image database of a plurality of faces of people at known face poses, wherein said module for creating a database comprises sub-modules to:

capture training images of faces of a plurality of people at a variety of face poses; and preprocess said training images by using an abstraction procedure to represent said training images in a simpler form, said abstraction procedure comprising:

deriving a group of coefficients from each training image that characterize the image to distinguish said training image from images of faces at a different pose range;

for each training image, selecting among the coefficients of the group of coefficients derived from the training image to form a set of feature vectors, each of which is tailored to a specific face pose range, wherein the same selection criteria is used to select the coefficients associated with training images belonging to the same pose range;

train a plurality of Support Vector Machines (SVMs) to indicate how closely a region extracted from an input image depicts a person's face exhibiting a face pose falling within the face pose range associated with that SVM using said feature vectors;

train a neural network to identify whether a region extracted from an input image depicts a person's face and to identify the respective face pose;

input an input image into the SVMs; and interpret the output of the neural network to detect whether the input image region contains a face and if so to identify the pose associated with each detected face.

18. The computer-readable memory of claim 17, wherein the module to train the SVMs comprises sub-modules to:

for each SVM sequentially input into the inputs of the SVM the primary feature vectors of the training images depicting faces exhibiting a pose within the pose range to which the SVM has been dedicated, wherein a primary feature vector is one which has been tailored to the pose range of the SVM being trained; and repeat the feature vector inputting action on until the output of the SVM stabilizes.

19. The computer-readable memory of claim 17, wherein the module to train the SVMs comprises sub-modules to:

intersperse negative example feature vectors with the sequentially inputted feature vectors in each SVM during training, wherein said negative example feature vectors are generated by abstracting images not depicting faces in the same manner as the training images to create a set of negative example feature vectors, and wherein only negative example feature vectors produced from image coefficients selected using the selection criteria associated with a particular face pose range are input into a SVM dedicated to that pose range; and instruct the SVMs that an inputted negative example is not a face.

20. The computer-readable memory of claim 19, wherein the module to train the SVMs comprises sub-modules to:

once the outputs of the SVMs stabilize, input out of range training image feature vectors into the SVM wherein said out of range feature vectors are feature vectors of a training image that does not depict a face having a pose within the face pose range that the SVM into which they are inputted is dedicated to; and whenever the output of a SVM indicates an out of range feature vector is associated with an image depicting a face within the face pose range the SVM is dedicated to, instruct the SVM that the out of range feature vector does not represent a face in the face pose range to which the SVM is dedicated.

21. The computer-readable memory of claim 17, wherein the program module for training said neural network comprises sub-modules to:

bring the neural network on line so as to be in communication with the outputs of the SVMs;

for each set of feature vectors generated from each training image, simultaneously input each feature vector of the set of feature vectors into the SVM dedicated to the pose range associated with the feature vector; and repeat the simultaneous feature vector input action until the outputs of the neural network stabilize.

22. The computer-readable memory of claim 21, wherein the program module for training said neural network further comprises sub-modules to:

(a) for a set of feature vectors generated from a training image, simultaneously input each feature vector of the set into the SVM dedicated to the pose range group associated with the feature vector;

(b) designate that the resulting output of the neural network is indicative of an input image region that depicts a person's face and has a face pose falling within the face pose range associated with the training image used to generate the set of feature vectors;

(c) repeat sub-modules (a) and (b) until a set of feature vectors representative of a training image from each face pose range has been simultaneously inputted into the SVM and the neural network output designated for each;

(d) designate any remaining undesignated output states the neural network is capable of producing as indicative of an output image region that either does not depict a face or does not depict a face exhibiting a face pose range that the face detection process has been trained to identify.

23. The computer-readable memory of claim 17, wherein the sub-module to input said input image comprises sub-modules to:

(a) extract a region from the input image;

(b) abstract the image region to create a set of feature vectors, wherein said abstracting is done in a same manner as employed to create said set of feature vectors for each training image;

(c) simultaneously input each feature vector of the set of feature vectors derived from the input image region into the SVM associated with the same pose as the feature vector;

(d) interpret the output of the neural network to determine if the input image region depicts a face and if so identifying the face pose range into which the face falls; and (e) repeat sub-modules (a) through (d) until regions from every part of the input image it is desired to screen for faces has been extracted and processed.

24. The computer-readable memory of claim 23, wherein the sub-module for extracting a region from the input image comprises a sub-module to:

progressively shift a search window across the input image and prior to each shift extract the pixels contained within the search window to create an input image region.

25. The computer-readable memory of claim 24, further comprising sub-modules to:

employ a search window having a size approximately equal to the size of the smallest face it is anticipated will be depicted in the input image and which it is desired to detect;

after regions from every part of the input image it is desired to screen faces has been extracted, reduce the size of the input image by a prescribed scale increment;

progressively shift the search window across the reduced input image and prior to each shift extract the pixels contained within the search window to create an input image region; and repeat the reducing and shifting process actions until a prescribed reduction limit is reached.

26. The computer-readable memory of claim 25, wherein the search window size corresponds to the size of the training images.

27. A face detection system for detecting a person's face depicted in an input image and identifying a face pose range, among a set of pose ranges, into which the pose associated with the detected face falls, comprising:

a plurality of support vector machines (SVMs) each of which has input and output units and each of which is dedicated to a particular face pose range, wherein each SVM has been trained to indicate how closely a region extracted from an input image depicts a person's face exhibiting a face pose falling within the face pose range associated with that SVM, where training each SVM comprises creating a training image database module wherein said module for creating a database comprises submodules to:

capture training images of faces of a plurality of people at a variety of face poses; and preprocess said training images to prepare them for input into the Support Vector Machines (SVMs) by using an abstraction procedure to represent said training images in a simpler form for processing them, said abstraction procedure comprising:

deriving a group of coefficients from each training image that characterize the image to distinguish said training image from images of faces at a different pose range;

for each training image, selecting among the coefficients of the group of coefficients derived from the training image to form a set of feature vectors, each of which is tailored to a specific face pose range, wherein the same selection criteria is used to select the coefficients associated with training images belonging to the same pose range;

a neural network whose inputs are in communication with the outputs of said SVMs and which has at least enough outputs to allow a different output to represent the detection of a person's face at each of the pose ranges, wherein the neural network has been trained to identify whether a region extracted from an input image depicts a person's face, and whenever the extracted region is identified as depicting a person's face, indicating the face pose range into which the face pose of the identified face falls; and wherein image feature characterizations derived from a region extracted from an input image are respectively input into separate ones of the inputs of the SVMs causing a single one of the outputs of the neural network to become active, thereby indicating whether the extracted region depicts a person's face or not, and if the extracted region does depict a person's face, indicating the pose range associated with the pose of the depicted face.

28. The system of claim 27 wherein each SVM only has one output unit.

29. The system of claim 27 wherein the output units from each SVM are input into each input of the neural network.

30. The system of claim 27 wherein the outputs of the neural network equals the number of input units plus at least one more.

31. The system of claim 34, wherein at least one of the outputs of the neural net indicates that the input region is not a face.

32. The system of claim 27, wherein the region extracted from the input image is extracted by progressively shifting a search window across the input image and prior to each shift extracting the pixels contained within the search window to create an input image region.

33. The system of claim 27, wherein the regions extracted from the input image are extracted by:

progressively shifting a search window across the input image and prior to each shift extracting the pixels contained within the search window to create an input image region, wherein the search window has a size approximately equal to the size of the smallest face it is anticipated will be depicted in the input image and which it is desired to detect;

after regions from every part of the input image it is desired to screen faces has been extracted, reducing the size of the input image by a prescribed scale increment;

progressively shifting the search window across the reduced input image and prior to each shift extracting the pixels contained within the search window to create an input image region; and repeating the reducing and shifting process actions until a prescribed reduction limit is reached.

34. A face detection system for detecting a person's face depicted in an input image and identifying a face pose range, among a set of pose ranges, into which the pose associated with the detected face falls, comprising:

a plurality of support vector machines (SVMs) each of which has input and output units and each of which is dedicated to a particular face pose range, wherein each SVM is trained to indicate how closely a region extracted from an input image depicts a person's face exhibiting a face pose falling within the face pose range associated with that SVM, where training each SVM comprises creating a training image database module wherein said module for creating a database comprises sub-modules to:

capture training images of faces of a plurality of people at a variety of face poses; and preprocess said training images to prepare them for input into the Support Vector Machines (SVMs) by using an abstraction procedure to represent said training images in a simpler form for processing them, said abstraction procedure comprising:

deriving a group of coefficients from each training image that characterize the image to distinguish said training image from images of faces at a different pose range;

for each training image, selecting among the coefficients of the group of coefficients derived from the training image to form a set of feature vectors, each of which is tailored to a specific face pose range, wherein the same selection criteria is used to select the coefficients associated with training images belonging to the same pose range;

a neural network whose inputs are in communication with the outputs of said SVMs and which has at least enough outputs to allow a different output to represent the detection of a person's face at each of the pose ranges, wherein the neural network is trained to identify whether a region extracted from an input image depicts a person's face, and whenever the extracted region is identified as depicting a person's face, indicating the face pose range into which the face pose of the identified face falls; and wherein regions extracted from an input image are capable of being respectively input into separate ones of the inputs of the SVMs to cause a single one of the outputs of the neural network to become active, thereby indicating whether the extracted region depicts a person's face, and if so, reporting the pose range associated with the pose of the depicted face.

35. The system of claim 34, wherein the regions extracted from the input image are extracted by:

(a) abstracting the image to create image feature characterizations thereof;

(b) extracting a region from the abstracted input image;

(c) repeating process actions (a) and (b) until regions from every part of the abstracted input image it is desired to screen for faces has been extracted and processed.

36. The system of claim 34, wherein the regions extracted from the input image are extracted by:

abstracting the image to create image feature characterizations thereof;

progressively shifting a search window across the abstracted input image and prior to each shift extracting the abstracted pixels contained within the search window to create an input image region, wherein the search window has a size approximately equal to the size of the smallest face it is anticipated will be depicted in the input image and which it is desired to detect;

after regions from every part of the abstracted input image it is desired to screen faces has been extracted, reducing the size of the input image by a prescribed scale increment;

abstracting the reduced input image to create image feature characterizations thereof;

progressively shifting the search window across the reduced abstracted input image and prior to each shift extracting the abstracted pixels contained within the search window to create an input image region; and repeating the reducing, abstracting and shifting process actions until a prescribed reduction limit is reached.

37. A computer-implemented object detection process for detecting an object in an input image and identifying its orientation within a range, comprising using a computer to perform the following process actions:

creating a database of a plurality of training image feature characterizations, each of which represents the object at a known orientation;

training a plurality of support vector machines (SVMs), each of which is dedicated to a particular range of orientations, to indicate how closely a region extracted from an input image depicts the object at an orientation which falls within the orientation range associated with that SVM, using said training image feature characterizations, which are abstracted so as to represent said images in simpler form for processing wherein said abstraction comprises:

deriving a group of image coefficients from each training image that characterize the image in a manner that distinguishes the image from other images depicting faces at a different pose range; and for each training image, selecting among the coefficients of the group of coefficients derived from the training image to form a set of feature vectors, each of which is tailored to a specific face pose range, wherein the same selection criteria is used to select the coefficients associated with training images belonging to the same pose range;

training a neural network having inputs which are in communication with the output of each SVM to identify, using the SVM outputs, whether a region extracted from an input image depicts the object, and whenever the extracted region is identified as depicting the object, indicating the orientation range into which the depicted object falls; and respectively inputting image feature characterizations derived from each of a series of regions extracted from an input image into ones of the SVMs, so as to cause the neural network to identify whether the extracted region depicts the object, and whenever the extracted region is identified as depicting the object, to indicate the orientation range into which the depicted object falls.

38. A computer-implemented face detection process for detecting a person's face in an input image regardless of the face pose exhibited by the face, comprising using a computer to perform the following process actions:

creating a database of a plurality of training image feature characterizations, each of which represents the face of a person at a known face pose;

training a plurality of support vector machines (SVMs), each of which is dedicated to a particular range of face poses, to indicate how closely a region extracted from an input image depicts a person's face exhibiting a face pose falling within the face pose range associated with that SVM, using said training image feature characterizations, which are abstracted so as to represent said images in simpler form for processing wherein said abstraction comprises:

deriving a group of image coefficients from each training image that characterize the image in a manner that distinguishes the image from other images depicting faces at a different pose range; and for each training image, selecting among the coefficients of the group of coefficients derived from the training image to form a set of feature vectors, each of which is tailored to a specific face pose range, wherein the same selection criteria is used to select the coefficients associated with training images belonging to the same pose range;

training a neural network having inputs which are in communication with the output of each SVM to identify, using the SVM outputs, whether a region extracted from an input image depicts a person's face; and respectively inputting image feature characterizations derived from each of a series of regions extracted from an input image into the SVMs, so as to cause the neural network to identify whether the extracted region depicts a person's face.

39. The process of claim 38, wherein the process action of inputting image feature characterizations derived from each of a series of regions extracted from an input image comprises the actions of:

(a) extracting a region from the input image;

(b) abstracting the image region to create image feature characterizations thereof, wherein said abstracting is done in a same manner as employed to create said image feature characterizations of each training image;

(c) inputting the image feature characterizations derived from the input image region into the SVMs;

(d) interpreting the output of the neural network to determine if the input image region depicts a face; and (e) repeating process actions (a) through (d) until regions from every part of the input image it is desired to screen for faces has been extracted and processed.

40. The process of claim 38 wherein the process action of inputting image feature characterizations derived from each of a series of regions extracted from an input image comprises the actions of:

(a) abstracting the image to create image feature characterizations thereof, wherein said abstracting is done in a same manner as employed to create said image feature characterizations of each training image;

(b) extracting a region from the abstracted input image;

(c) inputting the image feature characterizations derived from the input image region into the SVMs;

(d) interpreting the output of the neural network to determine if the input image region depicts a face; and (e) repeating process actions (b) through (d) until regions from every part of the abstracted input image it is desired to screen for faces has been extracted and processed.

* * * * *